United States Patent
Wu et al.

(10) Patent No.: US 11,161,693 B2
(45) Date of Patent: Nov. 2, 2021

(54) METHOD OF ROBOTIC TRANSPORT OF GOODS

(71) Applicant: Zhejiang Guozi Robot Technology Co., Ltd., Hangzhou (CN)

(72) Inventors: Weifeng Wu, Hangzhou (CN); Yikun Tao, Hangzhou (CN); Hongbo Zheng, Hangzhou (CN); Lingfen Zhu, Hangzhou (CN)

(73) Assignee: Zhejiang Guozi Robot Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/466,010

(22) PCT Filed: Jan. 16, 2017

(86) PCT No.: PCT/CN2017/071288
§ 371 (c)(1),
(2) Date: May 31, 2019

(87) PCT Pub. No.: WO2018/129740
PCT Pub. Date: Jul. 19, 2018

(65) Prior Publication Data
US 2019/0276236 A1    Sep. 12, 2019

(51) Int. Cl.
*B65G 1/137* (2006.01)
*B65G 1/04* (2006.01)

(52) U.S. Cl.
CPC ............. *B65G 1/1375* (2013.01); *B65G 1/04* (2013.01)

(58) Field of Classification Search
CPC combination set(s) only.
See application file for complete search history.

(56) References Cited

U.S. PATENT DOCUMENTS

| 4,492,504 | A |   | 1/1985 | Hainesworth |
| 5,953,234 | A | * | 9/1999 | Singer ................. B65G 1/0485 |
|           |   |   |        | 414/789.6 |

(Continued)

FOREIGN PATENT DOCUMENTS

| CN | 101584530 | 11/2009 |
| CN | 105730956 | 7/2016 |

(Continued)

*Primary Examiner* — Kyle O Logan
(74) *Attorney, Agent, or Firm* — Womble Bond Dickinson (US) LLP

(57) ABSTRACT

The present invention discloses a method of robotic transport of goods and relates to the field of storage logistics, including the following steps: providing a transport robot and shelves, the transport robot comprising a drive unit, a cargo box storing unit and a cargo box delivery unit, wherein the drive unit driving the cargo box storing unit and the cargo box delivery unit to move together; the cargo box storing unit and the shelves comprising one or more cargo box storing spaces, respectively; the transport robot autonomously moving to the front of a destination shelf according to a goods fetching instruction, the cargo box delivery unit acquiring one cargo box from one cargo box storing space of the shelf specified according to the goods fetching instruction, and then delivering the cargo box to another cargo box storing space in the cargo box storing unit specified according to the goods fetching instruction; repeating the goods fetching step if the instruction contains the goods fetching instruction for the same shelf; the transport robot autonomously moving to another shelf and repeating the goods fetching step if the instruction contains the goods fetching instruction for another shelf; the transport robot carrying the fetched goods and autonomously moving to a picking table after performing all the goods fetching instructions.

21 Claims, 1 Drawing Sheet

(56) References Cited

U.S. PATENT DOCUMENTS

| | | |
|---|---|---|
| 2008/0166217 A1 | 7/2008 | Fontana |
| 2009/0238666 A1 | 9/2009 | Chung |
| 2016/0101936 A1* | 4/2016 | Chamberlin ....... G01B 11/2522 700/214 |

FOREIGN PATENT DOCUMENTS

| | | |
|---|---|---|
| CN | 205555211 | 9/2016 |
| CN | 106005862 | 10/2016 |
| CN | 106276006 | 1/2017 |
| CN | 102658542 | 9/2019 |
| JP | 09-58814 | 3/1997 |

* cited by examiner

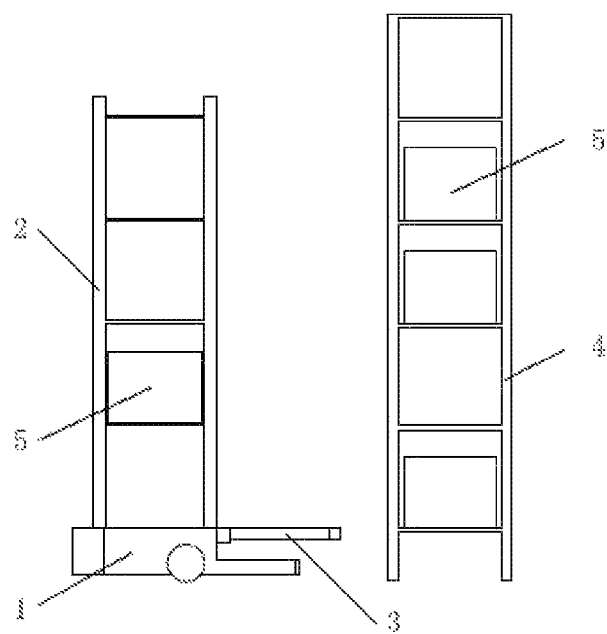

METHOD OF ROBOTIC TRANSPORT OF GOODS

FIELD OF THE INVENTION

The present invention relates to the field of automated warehousing and logistics, particularly to a method of robotic transport of goods.

DESCRIPTION OF THE PRIOR ART

Robotic transport is a method applied to automated materials transporting, having many advantages such as high automaticity, flexible applications, safety and reliability, high efficiency and convenient maintenance, and the like, and finds its broad applications in the field of logistics and transportation in auto manufacturing industries, food industries, tobacco industries and engineering and machinery industries and the like. In addition, transporting robots are widely applied in various public service places such as airport, hospitals and office buildings. These advantages make the transporting robot a key equipment in modern logistics systems and become one of the important members in the program of "machine substitution for human labor".

The transport method of "shelves coming to people" proposed by the KIVA company in the year 2011 has achieved great success, whose structure and method are stated in detail in the U.S. Pat. No. 7,850,413B2. Therefore, many similar transport methods of "shelves coming to people" are emerging in China, which also have good effects. However, the transport method of "shelves coming to people" also has a defect of having to transport the whole shelf to a picking area in order to fetch one piece of goods, which causes great wasting of resources. Moreover, only one kind of goods can be transported at a time.

Therefore, persons skilled in the art are devoted to developing a method of robotic transport of goods, which can transport various kinds of goods at a time, thereby increasing the transport efficiency of the transport robot.

SUMMARY OF THE INVENTION

In view of the above defects in the prior art, the technical problem to be solved by the present invention is how to increase the transport efficiency of the transport robot. Since the cargo boxes are to be transported, whose volume and weight are much less than those of the shelves, a plurality of cargo boxes can be transported at a time. A single cargo box at least stores one kind of goods, so various kinds of goods can be transported at a time.

In order to achieve the above aim, the present invention provides a method of robotic transport of goods, including the following steps.

Step 1: a transport robot and shelves are provided, the transport robot including a drive unit, a cargo box storing unit and a cargo box delivery unit, wherein the drive unit drives the cargo box storing unit and the cargo box delivery unit to move together; the cargo box storing unit and the shelves include one or more cargo box storing spaces, respectively;

Step 2: the transport robot autonomously moves to the front of a destination shelf according to a goods fetching instruction, the cargo box delivery unit acquires one cargo box from one cargo box storing space of the shelf specified according to the goods fetching instruction, and then delivers the cargo box to another cargo box storing space in the cargo box storing unit specified according to the goods fetching instruction;

Step 3: repeating Step 2 is if the instruction contains the goods fetching instruction for the same shelf;

Step 4: the transport robot autonomously moves to another shelf and repeating Step 2 if the instruction contains the goods fetching instruction for another shelf;

Step 5: the transport robot autonomously moves to the front of a destination shelf according to a goods storing instruction, the cargo box delivery unit acquires one cargo box from one cargo box storing space of the cargo box storing unit specified according to the goods storing instruction, and then delivers the cargo box to another cargo box storing space in the shelf specified according to the goods storing instruction;

Step 6: repeating Step 5 if the instruction contains the goods storing instruction for the same shelf;

Step 7: the transport robot autonomously moves to another shelf and repeating Step 5 if the instruction contains the goods storing instruction for another shelf.

Further, the cargo box storing unit can store a plurality of cargo boxes on layers at different heights; the shelf can store a plurality of cargo boxes on layers at different heights.

Further, the cargo boxes on layers at different heights of the cargo box storing unit can be stored onto the layers at different heights of the shelf by means of the cargo box delivery unit; the cargo boxes on layers at different heights of the shelf can be stored onto the layers at different heights of the cargo box storing unit by means of the cargo box delivery unit.

Further, the robot can place the cargo box of a certain layer of the cargo box storing unit onto another layer of the cargo box storing unit.

Further, the automated sorting function can be performed when the robot processes or stops.

Further, the transport robot can store the cargo box on any layer of the shelf to a specified layer of the cargo box storing unit by means of the cargo box delivery unit, and then store the cargo box on another layer of the same shelf to another specified layer of the cargo box storing unit by means of the cargo box delivery unit.

Further, the transport robot can store the cargo box on any layer of the shelf to a specified layer of the cargo box storing unit by means of the cargo box delivery unit, and then store the cargo box on any layer of another shelf to a specified layer of the cargo box storing unit by means of the cargo box delivery unit.

Further, the transport robot can store the cargo box stored on any layer of the cargo box storing unit to a specified layer of the shelf by means of the cargo box delivery unit, and then store the cargo box on another layer of the cargo box storing unit to another specified layer of the same shelf by means of the cargo box delivery unit.

Further, the transport robot can store the cargo box stored on any layer of the cargo box storing unit to a specified layer of the shelf by means of the cargo box delivery unit, and then store the cargo box on another layer of the cargo box storing unit to a specified layer of another shelf by means of the cargo box delivery unit.

Further, the transport robot can issue alarm information when the cargo box cannot be fetched in case of executing the goods fetching instruction, and the destination storing space is occupied in case of executing the goods storing instruction.

The present invention further provides a method of robotic transport of goods, including the following steps:

the transport robot autonomously moves to the front of a destination shelf according to a goods fetching instruction, the cargo box delivery unit acquires one cargo box from one cargo box storing space of the shelf specified according to the goods fetching instruction, and then delivers the cargo box to another cargo box storing space in the cargo box storing unit specified according to the goods fetching instruction;

or the transport robot autonomously moves to the front of a destination shelf according to a goods storing instruction, the cargo box delivery unit acquires one cargo box from one cargo box storing space of the cargo box storing unit specified according to the goods storing instruction, and then delivers the cargo box to another cargo box storing space in the shelf specified according to the goods storing instruction.

Further, the cargo box storing unit can store a plurality of cargo boxes on layers at different heights; the shelf can store a plurality of cargo boxes on layers at different heights.

Further, the cargo boxes on layers at different heights of the cargo box storing unit can be stored onto the layers at different heights of the shelf by means of the cargo box delivery unit; the cargo boxes on layers at different heights of the shelf can be stored onto the layers at different heights of the cargo box storing unit by means of the cargo box delivery unit.

Further, the robot can place the cargo box of a certain layer of the cargo box storing unit onto another layer of the cargo box storing unit.

Further, the automated sorting function can be performed when the robot processes or stops.

Further, the transport robot can store the cargo box on any layer of the shelf to a specified layer of the cargo box storing unit by means of the cargo box delivery unit, and then store the cargo box on another layer of the same shelf to another specified layer of the cargo box storing unit by means of the cargo box delivery unit.

Further, the transport robot can store the cargo box on any layer of the shelf to a specified layer of the cargo box storing unit by means of the cargo box delivery unit, and then store the cargo box on any layer of another shelf to a specified layer of the cargo box storing unit by means of the cargo box delivery unit.

Further, the transport robot can store the cargo box stored on any layer of the cargo box storing unit to a specified layer of the shelf by means of the cargo box delivery unit, and then store the cargo box on another layer of the cargo box storing unit to another specified layer of the same shelf by means of the cargo box delivery unit.

Further, the transport robot can store the cargo box stored on any layer of the cargo box storing unit to a specified layer of the shelf by means of the cargo box delivery unit, and then store the cargo box on another layer of the cargo box storing unit to a specified layer of another shelf by means of the cargo box delivery unit.

Further, the transport robot can issue alarm information when the cargo box cannot be fetched in case of executing the goods fetching instruction, and the destination storing space is occupied in case of executing the goods storing instruction.

Further, the steps further include:

repeating the goods fetching or storing process if the instruction contains the goods fetching or storing instruction for the same shelf; and the transport robot autonomously moving to another shelf and repeating the goods fetching or storing process if the instruction contains the goods fetching or storing instruction for another shelf.

The method of robotic transport of goods stated in the present invention can transport various kinds of goods at a time, with high work efficiency and low energy consumption.

The concepts, specific structure and resultant technical effects of the present invention are further explained below in combination with accompanying drawings, so as to fully understand the object, features and effects of the present invention.

BRIEF DESCRIPTION OF THE DRAWINGS

FIG. 1 is a schematic diagram of the method of robotic transport of goods in one preferred embodiment of the present invention;

wherein, 1. drive unit; 2. cargo box storing unit; 3. cargo box delivery unit; 4. shelf; 5. cargo box.

DETAILED DESCRIPTION OF THE PREFERRED EMBODIMENTS

As shown in FIG. 1, it is a schematic diagram of the method of robotic transport of goods, which mainly includes: a drive unit 1; a cargo box storing unit 2 and a cargo box delivery unit 3 mounted on the drive unit 1; a shelf 4; cargo boxes 5 that can be stored on the cargo box storing unit 2 and on the shelf 4.

The cargo box storing unit 2 can store a plurality of cargo boxes 5 on layers at different heights.

The shelf 4 can store a plurality of cargo boxes 5 on layers at different heights.

The cargo boxes 5 on layers at different heights of the cargo box storing unit 2 can be stored onto the layers at different heights of the shelf 4 by means of the cargo box delivery unit 3.

The cargo boxes 5 on layers at different heights of the shelf 4 can be stored onto the layers at different heights of the cargo box storing unit 2 by means of the cargo box delivery unit 3.

The robot has an autonomous moving function and can move to any position by means of the drive unit 1.

The robot has a function of automated sorting of the cargo boxes 5, and can place the cargo box 5 on a certain layer of the cargo box storing unit 2 to another layer of the cargo box storing unit 2.

In operation, the robot can store the cargo box 5 on any layer of the shelf 4 to a specified layer of the cargo box storing unit 2 by means of the cargo box delivery unit 3, and then store the cargo box 5 on another layer of the same shelf 4 to another specified layer of the cargo box storing unit 2 by means of the cargo box delivery unit 3.

In operation, the robot can store the cargo box 5 on any layer of the shelf 4 to a specified layer of the cargo box storing unit 2 by means of the cargo box delivery unit 3, and then store the cargo box 5 on any layer of another shelf 4 to a specified layer of the cargo box storing unit 2 by means of the cargo box delivery unit 3.

In operation, the robot can store the cargo box 5 stored on any layer of the cargo box storing unit 2 to a specified layer of the shelf 4 by means of the cargo box delivery unit 3, and then store the cargo box 5 on another layer of the cargo box storing unit 2 to another specified layer of the same shelf 4 by means of the cargo box delivery unit 3.

In operation, the robot can store the cargo box 5 stored on any layer of the cargo box storing unit 2 to a specified layer of the shelf 4 by means of the cargo box delivery unit 3, and then store the cargo box 5 on another layer of the cargo box storing unit 2 to a specified layer of another shelf 4 by means of the cargo box delivery unit 3.

The transport robot can issue alarm information when the cargo box cannot be fetched in case of executing the fetching instruction, and when the destination storing space is occupied in case of executing the storing instruction.

The preferred specific embodiments of the invention have been described in detail above. It is to be understood that numerous modifications and variations can be made by those ordinary skilled in the art in accordance with the concepts of the present invention without any inventive effort. Hence, the technical solutions that may be derived by those skilled in the art according to the concepts of the present invention on the basis of the prior art through logical analysis, reasoning and limited experiments should be within the scope of protection defined by the claims.

The invention claimed is:

1. A method of robotic transport of goods, comprising the following steps:
   Step 1: providing a transport robot and shelves, the transport robot comprising a drive unit, a first unit and a second unit, wherein the drive unit drives the first unit and the second unit to move together; the first unit and the shelves comprise one or more cargo box storing spaces, respectively;
   Step 2: moving the transport robot autonomously to the front of a destination shelf according to a goods fetching instruction, enabling the second unit to acquire one cargo box from one cargo box storing space of the shelf specified according to the goods fetching instruction, and then delivering the cargo box to another cargo box storing space in the first unit specified according to the goods fetching instruction;
   Step 3: repeating Step 2 if the instruction contains the goods fetching instruction for the same shelf;
   Step 4: moving the transport robot autonomously to another shelf and repeating Step 2 if the instruction contains the goods fetching instruction for another shelf;
   Step 5: moving the transport robot autonomously to the front of a destination shelf according to a goods storing instruction, enabling the second unit to acquire one cargo box from one cargo box storing space of the first unit specified according to the goods storing instruction, and then delivering the cargo box to another cargo box storing space in the shelf specified according to the goods storing instruction;
   Step 6: repeating Step 5 if the instruction contains the goods storing instruction for the same shelf;
   Step 7: moving the transport robot autonomously to another shelf and repeating Step 5 if the instruction contains the goods storing instruction for another shelf;
   wherein the method further comprises the following steps:
   enabling the transport robot to carry out automated sorting when the transport robot is moving, to improve transportation efficiency; wherein the automated sorting refers that the transport robot can place the cargo box of a certain layer of the first unit onto another layer of the first unit.

2. The method of robotic transport of goods according to claim 1, wherein the first unit can store a plurality of cargo boxes on layers at different heights; the shelf can store a plurality of cargo boxes on layers at different heights.

3. The method of robotic transport of goods according to claim 1, wherein cargo boxes on layers at different heights of the first unit can be stored onto the layers at different heights of the shelf by means of the second unit; cargo boxes on layers at different heights of the shelf can be stored onto the layers at different heights of the first unit by means of the second unit.

4. The method of robotic transport of goods according to claim 1, wherein the robot can place the cargo box of a certain layer of the first unit onto another layer of the first unit.

5. The method of robotic transport of goods according to claim 4, wherein an automated sorting function is performed when the robot processes or stops.

6. The method of robotic transport of goods according to claim 1, wherein the transport robot can store the cargo box on any layer of the shelf to a specified layer of the first unit by means of the second unit, and then store the cargo box on another layer of the same shelf to another specified layer of the first unit by means of the second unit.

7. The method of robotic transport of goods according to claim 1, wherein the transport robot can store the cargo box on any layer of the shelf to a specified layer of the first unit by means of the second unit, and then store the cargo box on any layer of another shelf to a specified layer of the first unit by means of the second unit.

8. The method of robotic transport of goods according to claim 1, wherein the transport robot can store the cargo box stored on any layer of the first unit to a specified layer of the shelf by means of the second unit, and then store the cargo box on another layer of the first unit to another specified layer of the same shelf by means of the second unit.

9. The method of robotic transport of goods according to claim 1, wherein the transport robot can store the cargo box stored on any layer of the first unit to a specified layer of the shelf by means of the second unit, and then store the cargo box on another layer of the first unit to a specified layer of another shelf by means of the second unit.

10. The method of robotic transport of goods according to claim 1, wherein the transport robot issues alarm information when the cargo box cannot be fetched in case of executing the goods fetching instruction, and a destination storing space is occupied in case of executing the goods storing instruction.

11. A method of robotic transport of goods, comprising the following steps:
   moving the transport robot autonomously to the front of a destination shelf according to a goods fetching instruction, enabling a second unit of the transport robot to acquire one cargo box from one cargo box storing space of a shelf specified according to a goods fetching instruction, and then delivering the cargo box to another cargo box storing space in the first unit specified according to the goods fetching instruction;
   or
   moving the transport robot autonomously to the front of a destination shelf according to a goods storing instruction, enabling a second unit of the transport robot to acquire one cargo box from one cargo box storing space of the first unit specified according to the goods storing instruction, and then delivering the cargo box to another cargo box storing space in the shelf specified according to the goods storing instruction;
   wherein the method further comprises the following steps:

enabling the transport robot to carry out automated sorting when the transport robot is moving, to improve transportation efficiency; wherein the automated sorting refers that the transport robot can place the cargo box of a certain layer of the first unit onto another layer of the first unit.

12. The method of robotic transport of goods according to claim 11, wherein the first unit can store a plurality of cargo boxes on layers at different heights; the shelf can store a plurality of cargo boxes on layers at different heights.

13. The method of robotic transport of goods according to claim 11, wherein cargo boxes on layers at different heights of the first unit can be stored onto the layers at different heights of the shelf by means of the second unit; cargo boxes on layers at different heights of the shelf can be stored onto the layers at different heights of the first unit by means of second unit.

14. The method of robotic transport of goods according to claim 11, wherein the robot can place the cargo box of a certain layer of the first unit onto another layer of the first unit.

15. The method of robotic transport of goods according to claim 14, wherein an automated sorting function is performed when the robot processes or stops.

16. The method of robotic transport of goods according to claim 11, wherein the transport robot can store the cargo box on any layer of the shelf to a specified layer of the first unit by means of the second unit, and then store the cargo box on another layer of the same shelf to another specified layer of the first unit by means of the second unit.

17. The method of robotic transport of goods according to claim 11, wherein the transport robot can store the cargo box on any layer of the shelf to a specified layer of the first unit by means of the second unit, and then store the cargo box on any layer of another shelf to a specified layer of the first unit by means of the second unit.

18. The method of robotic transport of goods according to claim 11, wherein the transport robot can store the cargo box stored on any layer of the first unit to a specified layer of the shelf by means of the second unit, and then store the cargo box on another layer of first unit to another specified layer of the same shelf by means of the second unit.

19. The method of robotic transport of goods according to claim 11, wherein the transport robot can store the cargo box stored on any layer of the first unit to a specified layer of the shelf by means of the second unit, and then store the cargo box on another layer of the first unit to a specified layer of another shelf by means of the second unit.

20. The method of robotic transport of goods according to claim 11, wherein the transport robot issues alarm information when the cargo box cannot be fetched in case of executing the goods fetching instruction, and a destination storing space is occupied in case of executing the goods storing instruction.

21. The method of robotic transport of goods according to claim 11, wherein the steps further comprise:
repeating the goods fetching or storing process if the instruction contains the goods fetching or storing instruction for the same shelf; and
the transport robot autonomously moving to another shelf and repeating the goods fetching or storing process if the instruction contains the goods fetching or storing instruction for another shelf.

\* \* \* \* \*